United States Patent

[11] 3,599,860

[72] Inventor James E. Huwaldt
14470 E. 13th Ave. C-46, Aurora, Colo. 80010
[21] Appl. No. 833,481
[22] Filed June 16, 1969
[45] Patented Aug. 17, 1971

[54] BATTERY-POWERED SHOCK DEVICE
12 Claims, 10 Drawing Figs.
[52] U.S. Cl. ..................................................... 231/2
[51] Int. Cl. ...................................................... B68b 11/00
[50] Field of Search .......................................... 231/2, 2 E; 273/84

[56] References Cited
UNITED STATES PATENTS
2,253,315  8/1941  Andrus ......................... 231/2
2,981,465  4/1961  Bartel ........................... 231/2
3,362,711  1/1968  Larsen et al. .................. 231/2 X Primary Examiner—Hugh R. Chamblee
Attorney—John E. Reilly ABSTRACT: An electric shock device with a yoke-shaped support member conformable to fit within the palm of the hand is arranged to releasably hold a dry cell battery between the spaced arms thereof. A pair of electrodes project from the support member which are operatively associated in a circuit with the battery to selectively short circuit electric energy provided by the battery by pressing the electrodes against the body of an animal which results in a shock. An elongated magnetic core having a primary and secondary winding is connected in the circuit to step up the electric voltage from the battery with the core forming a structural part of the support member for the supporting of the battery in place. One of a pair of vibrator contacts connected in the circuit is magnetically associated with the core to alternately open and close the circuit to induce the electric energy from the primary winding into the secondary winding.

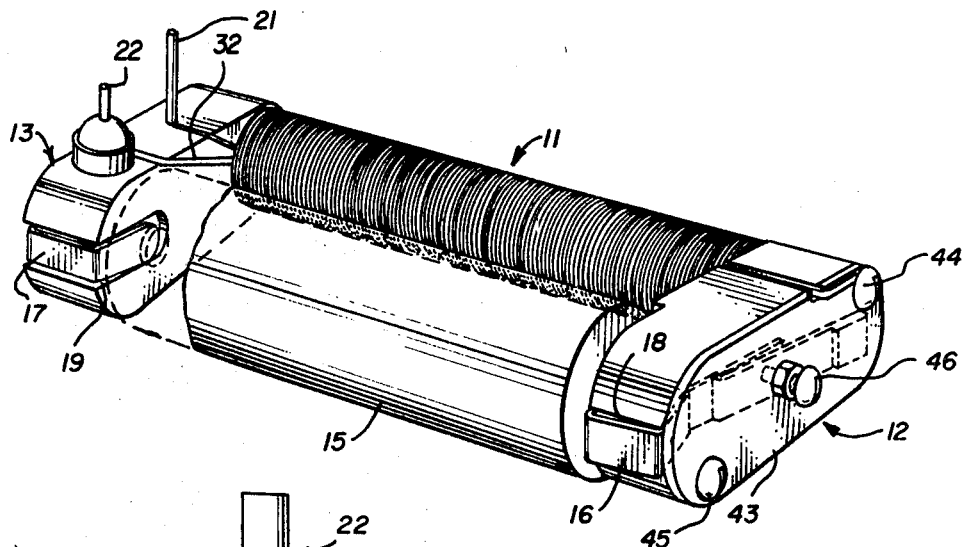
FIG. 1
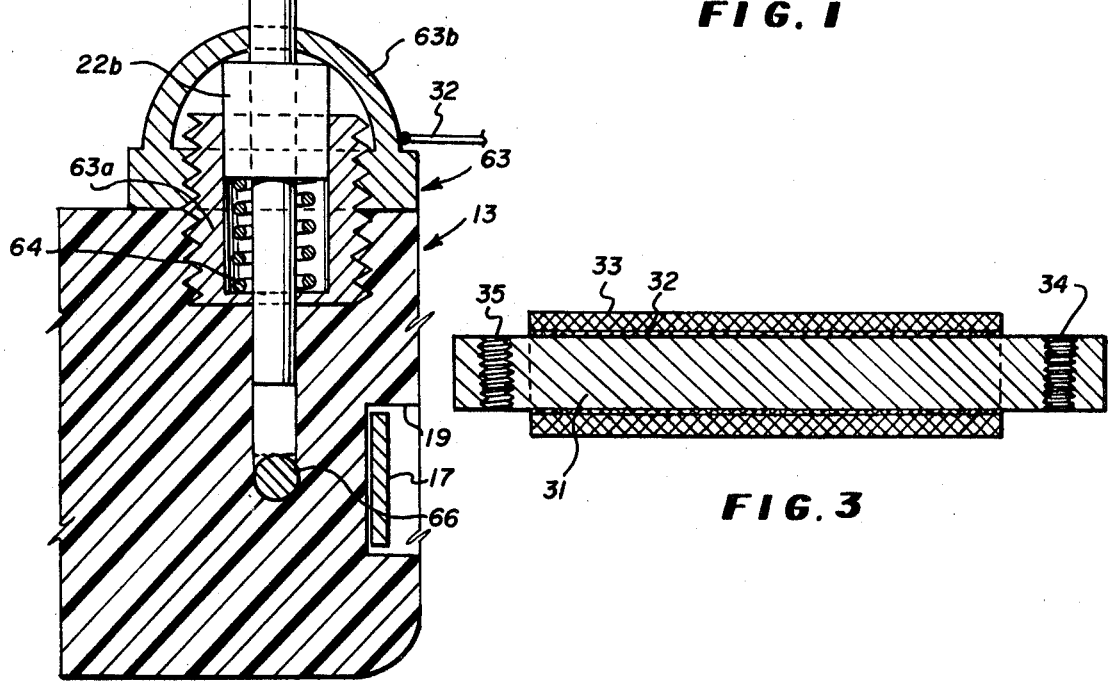
FIG. 2
FIG. 3
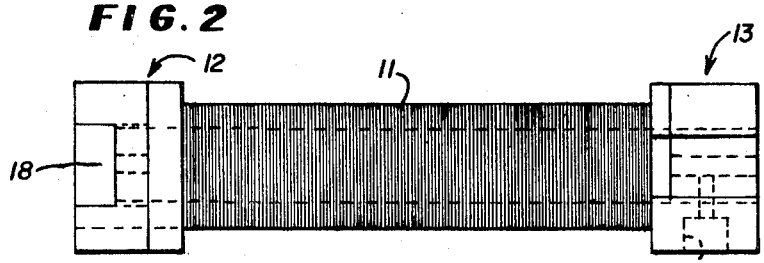
FIG. 4
INVENTOR.
James E. Huwaldt
BY
ATTORNEY INVENTOR.
James E. Huwaldt
BY
ATTORNEY

BATTERY-POWERED SHOCK DEVICE

This invention relates to electric shock devices and more particularly to a novel and improved hand-held, battery-powered shock device suitable for training animals and the like.

Electric shock devices for animals have heretofore been provided for use on cattle and are referred to as cattle prods. In general, these devices have utilized dry cell batteries and an electric vibrator in connection with a circuit associated with a transformer to step up the voltage. Cattle prods have generally taken the form of elongated tubular members with electrodes extending from one end and a grip handle on the opposite end with associated circuit parts being carried by the tubular member. A typical electric cattle prod is disclosed in U.S. Pat. to Jefferson No. 2,204,441. However, the size and arrangement of parts and the degree of shock of prior known cattle prods do not make them suitable for training use of other animals such as dogs, horses and the like.

Accordingly, it is an object of this invention to provide a novel and improved, battery-powered shock device which is suitable for training a variety of animals such as dogs and horses.

Another object of this invention is to provide a simple, durable and compactly arranged electric shock device which can be readily carried wholly within the palm of the hand to be concealed therein if desired.

Another object of this invention is to provide a compact electric shock device in which several of the parts perform multiple mechanical and electrical functions so as to reduce the size and cost of manufacture.

In accordance with the present invention there is provided a yoke-shaped support member having spaced arms arranged to releasably hold a dry cell battery or batteries in a compact arrangement which will fit wholly within the palm of the hand and use the conventional penlight-type dry cell battery. A pair of electrodes project from the support member and an electric circuit carried therewith transfers the energy from the battery through the electrodes to the body when the electrodes are pressed against the body of the animal to produce a shock effect. One of the electrodes is preferably arranged to function as a manual control switch to close the circuit when depressed and vibrator contacts contained in one of the support arms are connected in the circuit and magnetically coupled to the core of the transformer to alternately open and close the primary winding once it is energized so as to induce electric energy from the primary winding into the secondary winding to increase the voltage provided by the battery.

Other objects, advantages and capabilities of the present invention will become more apparent as the description proceeds taken in conjunction with the accompanying drawings, in which:

FIG. 1 is a perspective view of an electric shock device with a fragment of a penlight dry cell battery shown mounted in an operative position thereon.

FIG. 2 is a fragmentary vertical sectional view through the movable electrodes.

FIG. 3 is a longitudinal sectional view through the elongated transformer portion when detached from the support arms.

FIG. 4 is an elevational view of the yoke-shaped assembly without the associated parts being mounted on the support arm bodies as viewed looking toward the outwardly projecting ends thereof.

Figure 7:
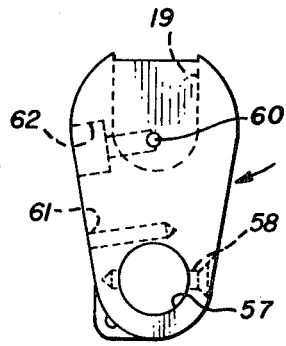
FIG. 7 is an inner end elevation view of the other support arm body.
Figure 8:
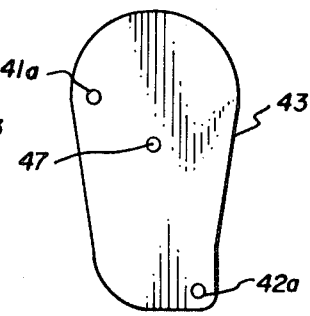
FIG. 8 is an outer end elevation view of the electrically conductive cover plate which removably mounts on the end of one of the support arm bodies.
Figure 9:
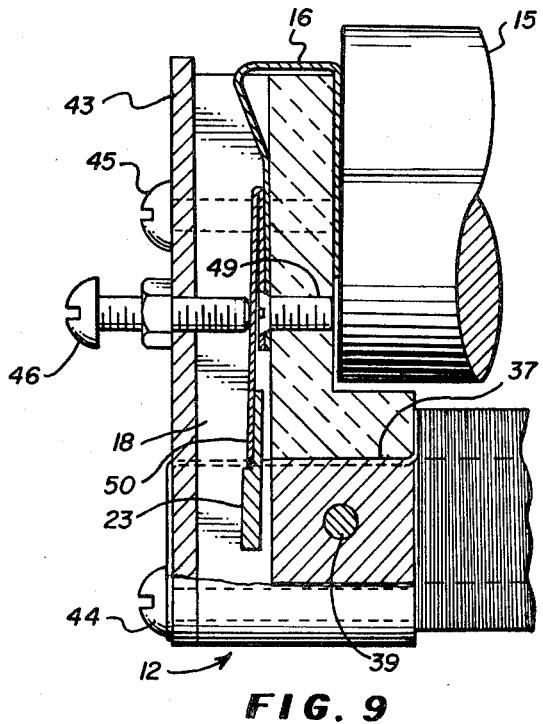
Figure 10:
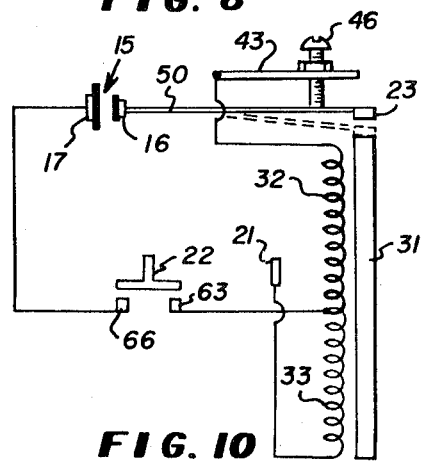

FIG. 9 is a fragmentary vertical sectional view showing the support arm having the vibrator contacts and an armature portion supported thereon; and FIG. 10 is a schematic electric circuit diagram showing the electrical connections of various parts of the device illustrated in FIGS. 1 through 9. Referring now to the drawings, the electric shock device shown comprises a yoke-shaped support member which broadly comprises an intermediate portion 11, support arms 12 and 13 projecting outwardly at the opposite ends of the intermediate portion; the arms being spaced a preselected distance from one another according to the length of the battery 15 which is supported between the support arms.

The inner surfaces of the arms are constructed and arranged to slidably receive and releasably support a battery or batteries in a manner to be described. The term battery as used herein is intended to refer to any portable electric power source which is presently a commercially available dry cell-type battery. While a single battery has been shown it is understood that a plurality of shorter batteries disposed end-to-end could also be used. For a firm battery support together with the required electrical engagement with the terminals of the battery at the ends thereof, there is provided on the arms, battery contacts 16 and 17 advantageously disposed in slots or recesses 18 and 19, respectively in arms 12 and 13. Contacts 16 and 17 are in the form of thin, flat, electrically conductive strips each of which extends along the outer side, across the end and along the inner side so that each strip is essentially of a u-shaped configuration. Recessed portion 18 extends across the outer end and along the outer side of arm 12 but not along the flat inner side of arm 12 so that the conductive strip will project above the inner surface and make good contact with the output terminal at the bottom of the battery as best shown in FIG. 9. Recess 19, receiving a strip 17, extends along the inner side of arm 13 to slidably receive the typical protruding centrally disposed terminal of the battery 15. This recess 19 also serves to prevent the battery from slipping laterally out from between the support arms once it has been put in place.

A pair of electrodes 21 and 22 project from the side of arm 13 and press against the body of an animal to transfer electric energy thereto. The electric energy from the battery is transferred to these electrodes through a normally open electric circuit hereafter described more fully.

The intermediate portion 11 is comprised of a transformer section electrically connected in the circuit for stepping up the voltage from the battery to a more suitable level for shocking and includes a straight, magnetic core 31, a primary winding 32 wound on the core and a secondary winding 33 wound on the primary winding as best shown in FIG. 3. The primary winding 32 is shown to be of a heavier wire of fewer wraps than the finer secondary winding to provide a suitable transformer ratio to step up the battery voltage. The support arms 12 and 13 removably mount on the ends of the core so that the core advantageously forms a structural part of the support member for the battery. The ends of the core are provided with threaded holes 34 and 35 to facilitate assembly and disassembly of the support arms to the core using threaded screws. Generally arms 12 and 13 are formed of an integral body made of an electric insulator material such as a hard plastic and are provided with a plurality of holes or recesses drilled and/or formed therein to advantageously receive and support other associated parts hereinafter described.

Figure 5:
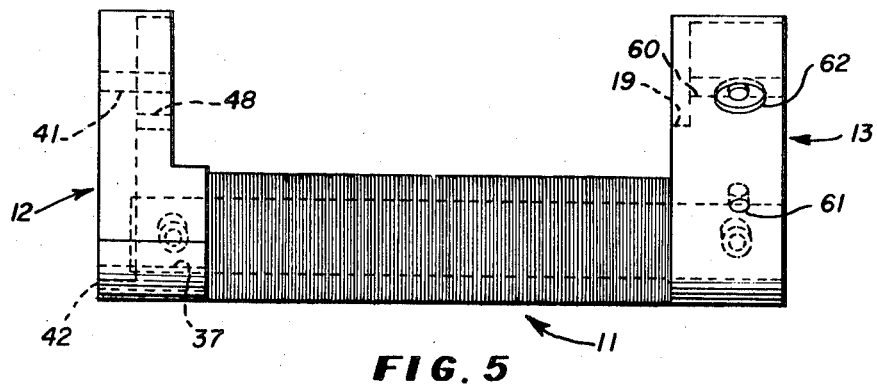
FIG. 5 is a side elevational view of the yoke-shaped member shown in FIG. 4.
Figure 6:
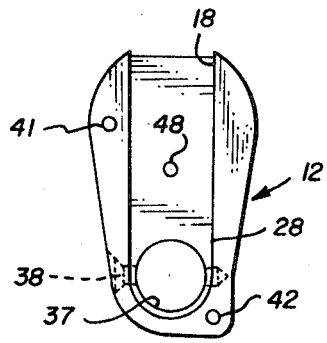
FIG. 6 is an outer end elevation view of one of the support arm bodies.

As best shown in FIGS. 6—8, arm 12 is provided with a hole 37 into which one end of the core is inserted in a frictional engagement. A small hole 38 is provided transverse to hole 37 which receives a setscrew (not shown) threading into the threaded aperture 34 of the core to detachably fasten one end of the core to the support arm. Two holes 41 and 42 with internal threads are provided in arm 12 to facilitate the attachment of an electrically conductive cover plate 43 also having holes 41a and 42a which align with holes 41 and 42, respectively. Screws 44 and 45 shown in FIG. 9 thread into the holes 41 and 42 and 41a and 42a respectively to hold plate 43 in place on arm 12.

To automatically open and close the circuit once the primary winding has been energized there is provided an electric vibrator including a contact 46 disposed in recess 18 and a contact 50 supported on plate 43. Contact 46 is in the form of an adjustable setscrew which threads into a hole 47 in the conductive plate 43 to dispose it so that its inner end engages contact 50 within the recess 18. Vibrator contact 50 is in the form of a thin flat strip of resilient conductive metal bent or folded about an intermediate portion to form a leaf-type spring. One end of the strip 50 and battery contact 16 is secured against the support arm body by providing a central hole 48 in the arm body into which is threaded a bolt 49; bolt 49 thereby connecting a battery contact 16 to the vibrator contact 50 to make an electrical connection in the circuit from batter contact 16 to one side of the primary winding through bolt 46 and plate 43 with bolt 44 securing one terminal end of the primary winding against the plate as best shown in FIG. 9. The other free end of strip 50 supports an iron armature portion 23 in spaced proximity to an end of the core 31 held in arm body 12. The movement of the bolt 46 by threading against the strip 50 will thereby serve to adjust the gap between the armature portion 23 and core 31 against the resilient action of the bent strip. In this way the transformer core also cooperates with the armature portion to form an electromagnet which upon the magnetization of the core will draw contact 50 away from contact 46 so as to open the circuit each time the primary winding is energized and the circuit will subsequently close by the spring action of the resilient strip.

Arm 13 is provided with a hole 57 into which the other end of the core 31 is inserted together with a transverse hole 58 which receives a locking screw 39 threading into the aperture 35 of the core. A hole 60 is provided centrally of arm 31 ad holes 61 and 62 are formed in the sides of arm 13, the latter holes 61 and 62 receiving a portion of electrodes 21 and 22, respectively and hole 60 being in communication with the inner end of hole 62. Electrode 21 is formed of an electrical conductive material and of a rodlike configuration. Electrode 22 is also formed of an electrically conductive material and is slidably arranged in the arm body so as to be forcibly depressed into hole 62 as best shown in FIG. 9. Hole 62 has a larger outer diameter section with internal threads into which is threaded a housing assembly 63. This assembly has an internal bore sized to slidably receive and support an enlarged intermediate portion 22b of the electrode and a smaller diameter inner section sized to slidably receive an inner narrower end portion of the electrode. A tension spring 64 is disposed in the internal bore of assembly 63 and engages a bottom wall in the housing and the underside of the enlarged portion 22b so as to bias or push the electrode to a normally extended position as shown. The housing or body 63 is a two-part assembly comprising an externally threaded member 63a which threads into the support arm aperture 62 and a cap 63b with internal threads which thread over the member 63a. Cap 63b has a central aperture through which the upper narrower portion of electrode 21 extends. Assembly 63 is formed of an electrical conductive material and functions as a terminal of an electric switch in the electric circuit to which is connected the other terminal end of primary winding 32, as best shown in FIGS. 1 and 2. The other terminal of the switch is provided by a screw 66 which threads into hole 60 and also functions to hold battery contact 17 in place on the support arm body. In the depressed position the bottom end of electrode 22 engages screw 66 and in this way completes the circuit between the two terminals 66 and 63 and thereby between battery contact 17 and one terminal end of the primary winding 33. In this way the electrode 22 and associated terminals 63 and 66 function as a manually operable, normally open electric switch in the circuit with the switch being closed when the electrode is pressed against the body of an animal.

In the complete sequence of operation as best understood with reference to FIG. 10 when the electrodes 21 and 22 are pressed against the body of an animal the secondary winding is short circuited and the normally open circuit is closed momentarily. With the circuit closed, the electric energy from the battery is transferred to the primary winding and is in turn induced into the secondary winding which is transferred to the body of the animal as an electric shock through electrodes 21 and 22. As long as electrode 22 is depressed the vibrator contacts will alternately open and close the circuit through the vibrator contacts 46 and 50 by the opening of the circuit when the core is magnetized and the closing of the circuit when the core is demagnetized. The electric energy in the primary winding induces energy into the secondary winding to provide a stepped up voltage at the electrodes in accordance with well-known transformer principals. Typical transformer windings included by way of illustration and not be way of limitation have a primary winding of 160 turns of No. 24 wire arranged in two layers on the core and a secondary winding of 16,000 turns of No. o. 44 wire wound over the primary winding in smooth layers to provide a transformation ratio of 100 to 1. A penlight battery suitable for these particular windings is a 1½-volt rating. A typical battery of this type and rating is one which has a length of about 1⅞ inches and the support member for the battery has a length of about 2½ inches.

Although the present invention has been described with a certain degree of particularity, it is understood that the present disclosure has been made by way of example and that changes in details of structure and system components may be made without departing from the spirit thereof.

What I claim is:

1. A battery-powered shock device adapted for training animals comprising a generally yoke-shaped support member conformable to fit in the palm of the hand having an intermediate portion and support arms attached to opposite ends of the intermediate portion and disposed to releasably hold a dry cell battery between the arms, a pair of electrodes projecting from the support member, a circuit selectively transferring the electric energy of the battery through the electrodes to a body of an animal when the electrodes are pressed against the body, and a core forming a structural part of said support member having a primary and a secondary winding wrapped on the core, said primary winding being connected in the circuit with the battery and said secondary winding being connected to the electrodes so as to step up the voltage of the battery.

2. A battery-powered shock device as set forth in claim 1 wherein the length of the support member is not in excess of 6 inches.

3. A battery-powered shock device as set forth in claim 14 wherein said electrodes project from the sides of one of said support arms in a direction transverse to the battery.

4. A battery-powered shock device as set forth in claim 1 wherein each of said support arms includes a main body portion formed of electric insulator material in which the associated connecting parts of said circuit are recessed and removably mounted.

5. A battery-powered shock device as set forth in claim 1 wherein one of said electrodes is movably mounted in a recess in one of said support arms to depress into the arm with said one electrode being biased to automatically return to its extended position to selectively close and open the circuit.

6. A battery-powered shock device as set forth in claim 1 wherein one of said arms includes a recess containing a pair of normally open vibrator contacts connected in the circuit to automatically open and close the circuit once the primary winding is energized to induce electric energy from the primary winding into the secondary winding.

7. A battery-powered shock device as set forth in claim 6 wherein one of said vibrator contacts supports an armature portion, said armature portion being attracted by the magnetization of the core to open the contacts when the primary winding is energized.

8. An electric shock device adapted for training animals comprising a generally yoke-shaped support member conformable to fit wholly within the palm of the hand having an intermediate portion and support arms attached to opposite ends of the intermediate portion and disposed to releasably hold a battery, a pair of electrodes mounted on one arm, and a control circuit in the support member for selectively transferring electric energy from the battery through the electrodes to the body of an animal when the electrodes are pressed against the body, said circuit including an electric transformer having a core forming a structural part of the support member and primary and secondary windings wrapped on the core to step up the electric energy of the battery, said primary winding being connected in the circuit with the terminals of the battery and said secondary winding being connected to the electrodes, vibrator contacts in the circuit magnetically associated with the core to alternately open and close the circuit once the primary winding has been energized to induce electric energy applied to the primary winding into the secondary winding.

9. A battery-powered electric shock device adapted for training animals comprising a generally yoke-shaped support member having an intermediate portion including a magnetic core, primary and secondary windings wrapped on the core and support arms attached to opposite ends of the core and disposed to releasably hold a dry cell battery, a pair of electrodes projecting from one arm operatively associated with the terminal ends of the secondary winding, each said arm having an electric contact disposed to releasably engage a terminal of the battery supported between the arms, said battery terminal contacts being connected with the primary windings in a normally open circuit, normally closed vibrator contacts magnetically associated with the core to alternately open and close the circuit once the circuit primary winding is energized whereby electric energy from the battery and applied to the primary winding is induced into the secondary winding to produce a shock effect when the electrodes are pressed against the body of an animal.

10. A battery-powered electric shock device as set forth in claim 9 wherein one of said electrodes is movable between an extended open position and a depressed closed position and operatively associated in the circuit to close the circuit when moved to the depressed position, said electrode being biased to automatically return to the extended open position.

11. A battery-powered electric shock device as set forth in claim 9 wherein one of said vibrator contacts is in the form of a relatively narrow, metal conductive strip mounted in a recessed portion in one support arm and bent about an intermediate portion in one end portion connected to a battery terminal contact and the other end portion in spaced proximity to the end of the core.

12. A battery-powered electric shock device as set forth in claim 11 wherein the other of said vibrator contacts is a bolt with threads threading into a conductive plate mounted in a detachable covering in relation to said recessed portion on the support arm which bears against the bent conductive strip to make an electric contact therewith and an armature portion carried by the conductive strip disposing it in proximity to the core.